Jan. 14, 1930.　　　L. RADFORD ET AL　　　1,743,979
SEXTANT
Filed Feb. 12, 1927　　　5 Sheets-Sheet 4
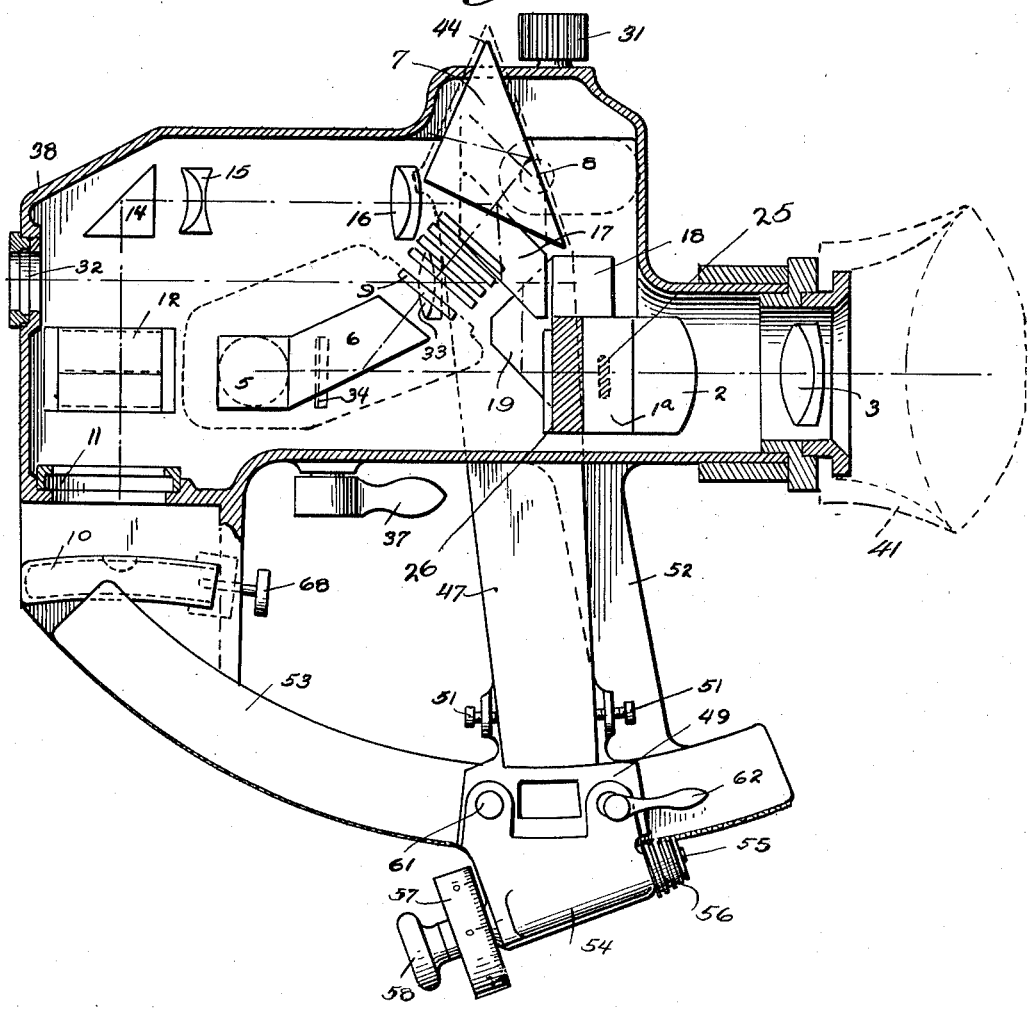
INVENTORS
L. Radford
N. Davis
BY
ATTORNEY.

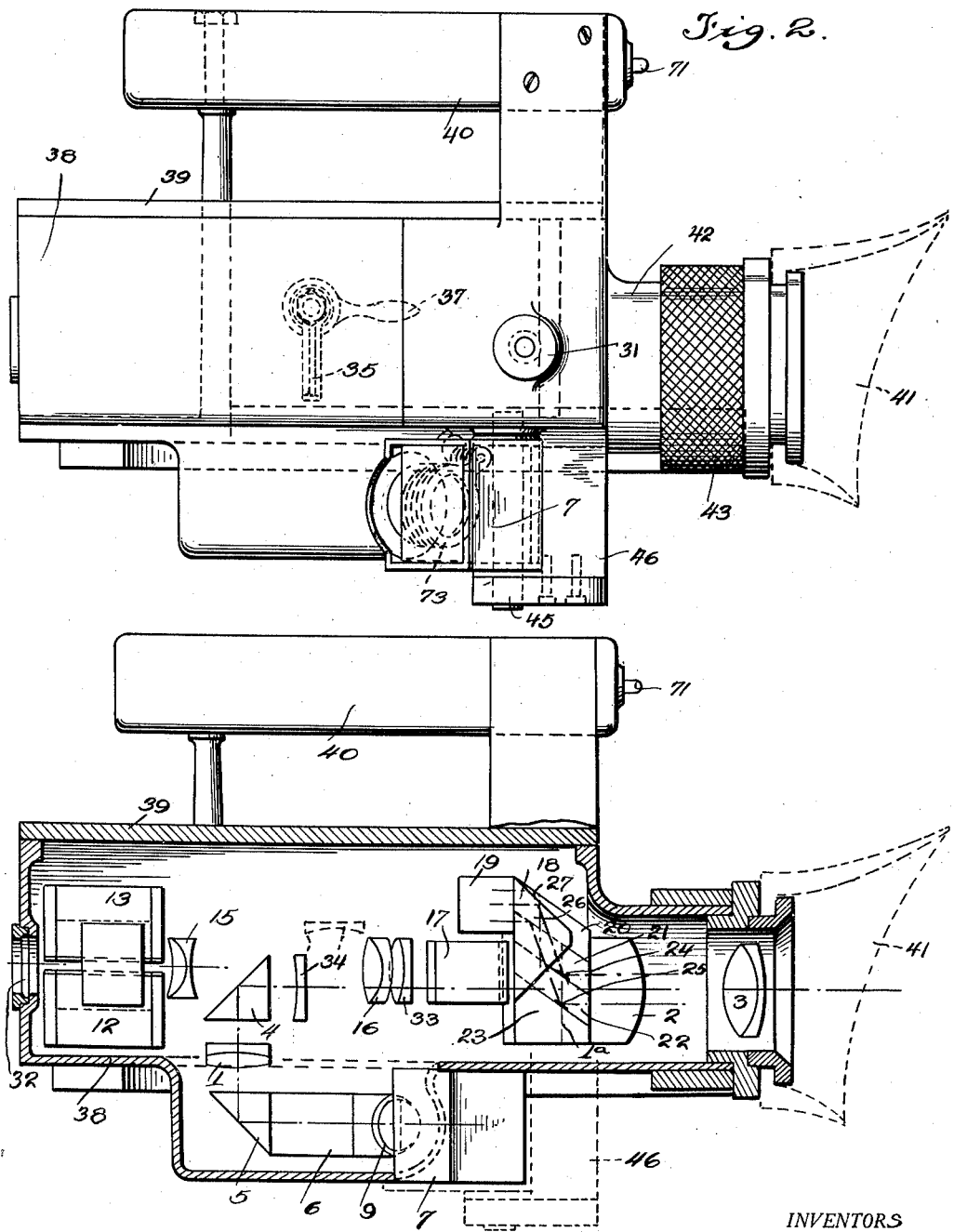

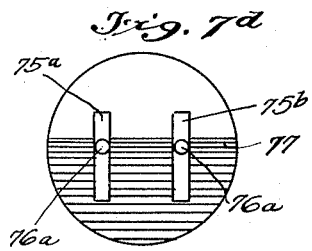
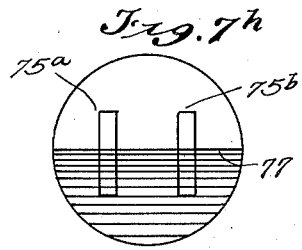
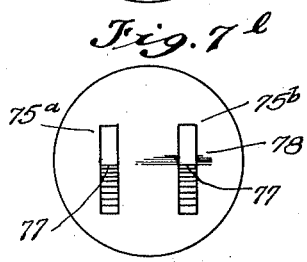
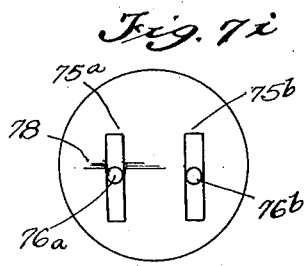
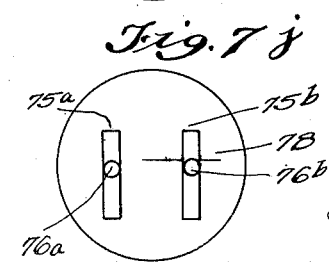
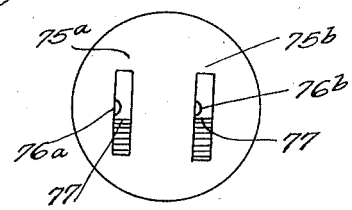
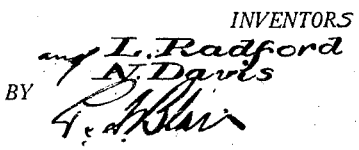

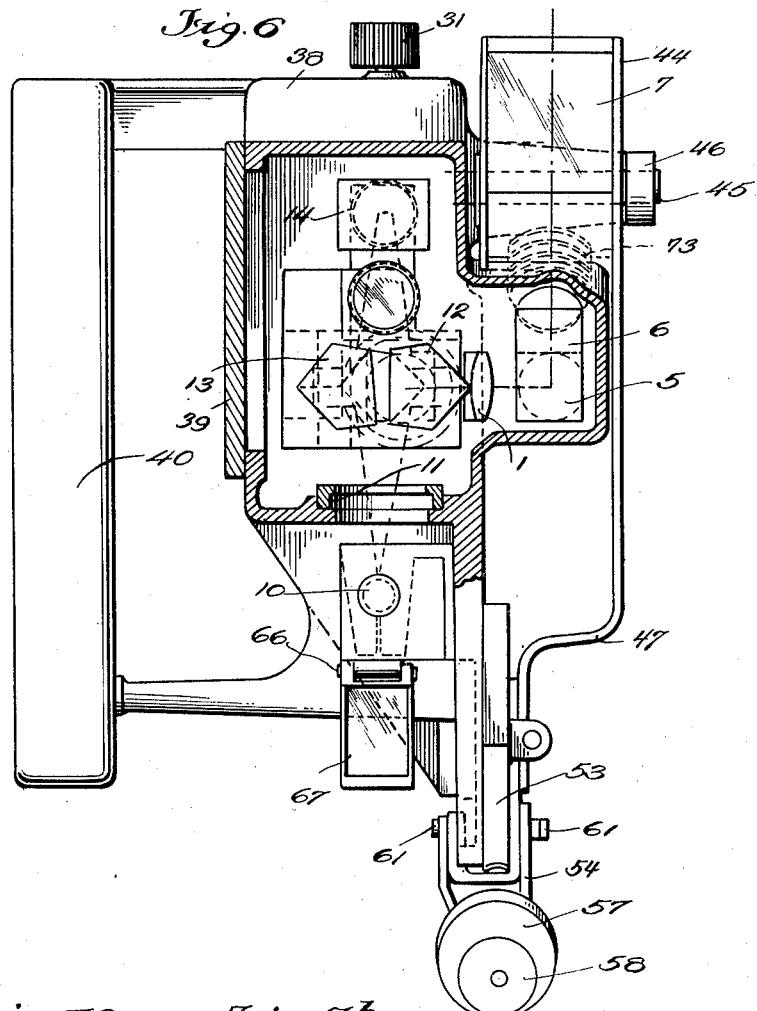
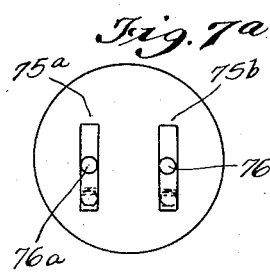
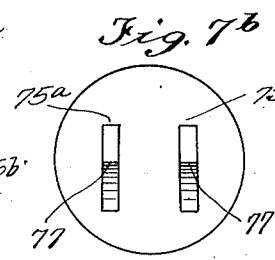
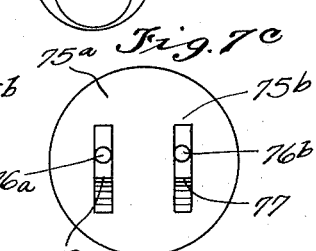
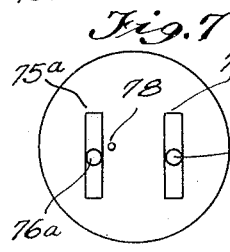
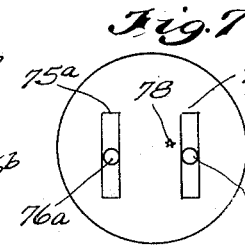
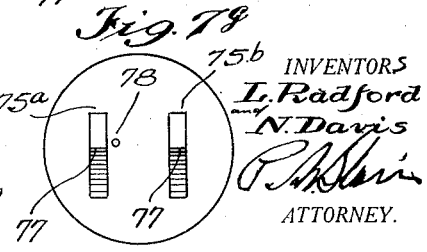

Patented Jan. 14, 1930

1,743,979

UNITED STATES PATENT OFFICE

LAWRENCE RADFORD, OF WASHINGTON, DISTRICT OF COLUMBIA, AND NOEL DAVIS, OF LEE HEIGHTS, VIRGINIA; MARY ELIZABETH DAVIS, ADMINISTRATRIX OF SAID NOEL DAVIS, DECEASED, ASSIGNORS TO THE AMERICAN SEXTANT CORPORATION

SEXTANT

Application filed February 12, 1927. Serial No. 167,777.

This invention relates to instruments especially adapted for use in measuring angles, and in its more intense aspect to instruments generally known as sextants or octants, depending on the maximum angle which can be measured.

One of the objects of the present invention is to provide a simple and practical instrument of the above character whereby the altitude of the sun, a star, or any heavenly body above either the true horizontal or above the actual horizon at the place of observation may be determined quickly, conveniently and with a high degree of accuracy, whether the instrument be used in an aircraft, or on a ship, in daylight or in darkness.

A further object is to provide an apparatus of the above character which may be easily and quickly checked and corrected for inaccuracies.

A further object is to provide an apparatus of the above character of compact construction which may be easily and conveniently handled and in which the optical parts are carefully housed to protect the same principally from atmospheric conditions.

Another object is to provide convenient means permitting artificial illumination when necessary.

Another object is to provide an instrument of the above character permitting accurate checking as to the angle of observation as well as corrections and checking of observations taken.

Other objects will be in part obvious from the following analysis of the invention and in part hereinafter pointed out in connection with the accompanying drawings illustrating a preferred embodiment of the invention and in the several views of which corresponding parts are indicated by similar reference characters.

In these drawings—

Fig. 2 is a plan view of the instrument.

Fig. 3 is an end elevational view of the instrument.

Fig. 4 is substantially a longitudinal sectional view thru the left side of the instrument showing the optical parts.

Fig. 5 is a sectional plan view showing the optical parts.

Fig. 6 is a front elevation, partly in section, showing the optical parts.

Figure 1:
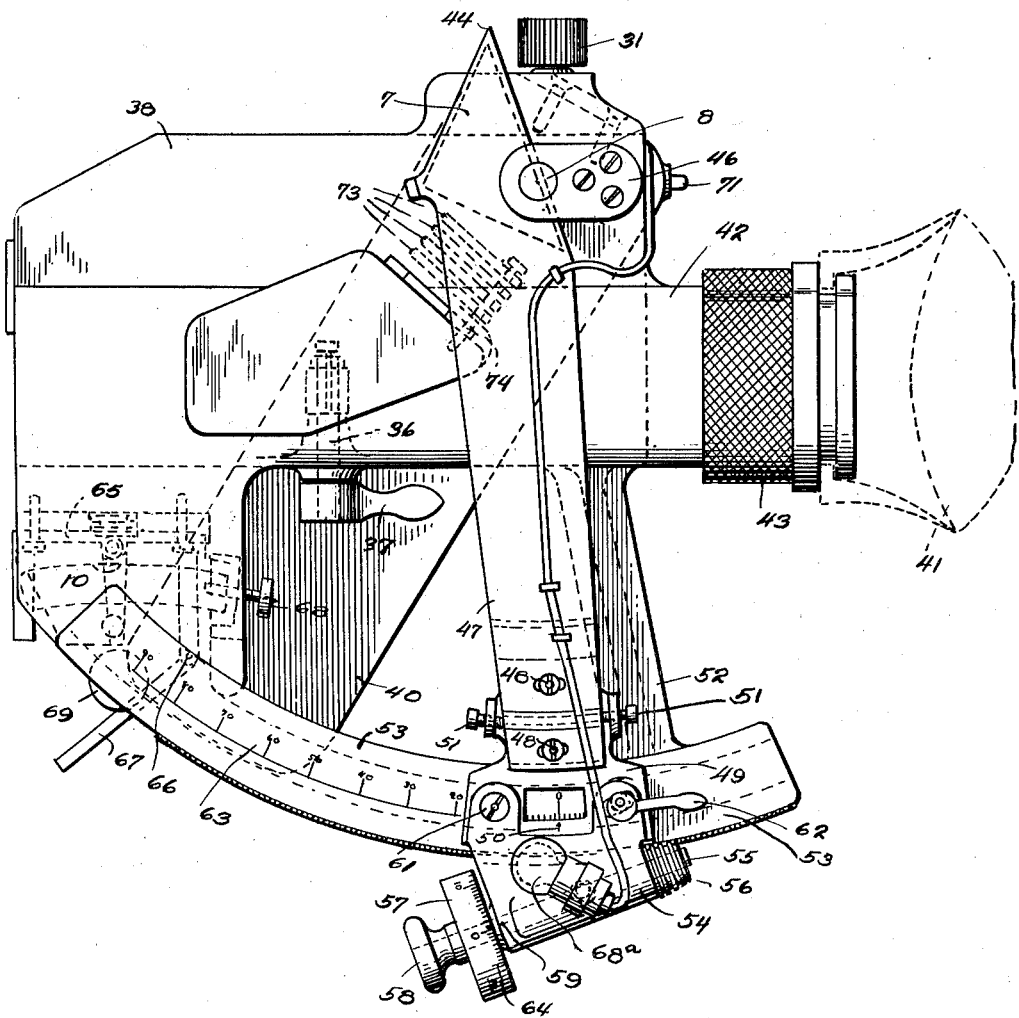
Fig. 1 is a view of the left side of the instrument viewed from its position in use.

Figs. $7^a$, $7^b$, $7^c$, $7^d$, $7^e$, $7^f$, $7^g$, $7^h$, $7^i$, $7^j$, $7^k$ and $7^l$ illustrate the appearance of the field of view obtained thru the instrument under various conditions.

Referring first to Figs. 4, 5 and 6, let us consider the optics of the instrument, all of which are suitably housed to protect the same from atmospheric conditions. This optical system includes a lens 1 which forms in the focal plane $1^a$ a real image of the sun, star, or other object viewed, the relative angular position of which, with respect to the horizontal or horizon, it is desired to determine. This image is viewed by means of the eyepiece consisting of lens 2 and 3. This image is erected laterally by means of the two reflecting prisms 4 and 5, and is erected vertically by means of the two reflecting prisms 6 and 7. Prism 7 is rotatable about an axis 8 (shown also in Fig. 1). Rotation of the prism 7 on its axis shifts the position in the field of view of the image of the object sighted, and also enables the observer using the instrument to take observations on objects at different positions, or elevations, without moving the instrument as a whole. The rays, after emerging from prism 7 pass thru the window 9 before entering prism 6.

Secured to the lower side of the case of the instrument is a spirit level 10. The rays of light from this level pass thru a window 11, and a part of these rays enter a prism system 12, 12 and another part enter a similar system 13, 13. The rays from both systems are reflected by prism 14 and a real image of the bubble in the spirit level is formed by lenses 15 and 16. This image lies in the same plane $1^a$ as that formed by lens 1. The rays emerging from lens 16 are twice reflected in a prism 17, and after passing thru prisms 18 and 19 enter a system consisting of prisms 20, 21, 22 and 23. These rays are reflected twice in prism 18 and twice in prism 19, and therefore these prisms reverse the image of the bubble both laterally and vertically. On opposite faces of the prism 22 are two silvered strips 24 and 25 with sharply defined edges, each of which is bisected longitudinally by the focal plane. Since these silvered strips are in or near the focal planes, their edges will appear sharply defined in the field of view. Also a portion of one surface of prism 21 is silvered as at 26. The rays from the spirit level 10 which pass thru prisms 12, lenses 15 and 16, and prisms 17, 18 and 19 enter prism 20 and are reflected into the eyepiece consisting of lenses 2 and 3. The rays which pass thru the prism system 13, also pass thru lenses 15 and 16, and prisms 17, 18 and 19, enter prism 21, are reflected by the silver surface 26 to the silver strip 25, and are likewise reflected into the eyepiece 2, 3. Thus the observer, on looking into the instrument sees in the field of view two parallel rectangular areas demarcated by the edges of the silver strips 24 and 25 respectively, and in each of these he sees an image of the bubble in the spirit level 10. (See Fig. 7ª.) The parts concerned in the formation of these images may be adjusted so that if the axis 8 is horizontal, each image of the bubble appears to lie midway betwen the two longer sides of the rectangle in which it is seen.

The prism 17 is mounted in a frame 28 (Fig. 3) which slides in guides 29. This movement of the prism 17 is accomplished by rotation of a screw 30 as by means of a milled head 31. When the prism 17 is raised to the position shown by the dotted lines in Fig. 4, the rays from the lens 16 no longer enter the prism 18, and the images of the bubble disappear from the field of view of the instrument. When the prism 17 is in this position, lens 33 forms in the rectangular areas already referred to an image of a distant object, for instance the horizon, as shown in Fig. 7ᵇ. The rays forming this image enter the instrument thru a window 32, and after emergence from a lens 33 pass thru the prisms 18, 19, 20, 21 and 22, and to the eyepiece 2, 3, in the same manner as those from lens 16, when prism 17 is in the position shown by full lines, as described before.

It will be noted that in the embodiment of the invention here described, the light transmitted by the lens 1 is entirely excluded from the rectangular areas in the field of view, and likewise the light transmitted either by the lens 33 or lenses 15 and 16 is entirely excluded from that portion of the field of view outside the rectangular areas.

Numeral 34 indicates a cylindrical lens which may be swung either into or out of the path of the rays from lens 1 to the eyepiece. The axis of the cylinder of this lens is parallel to the longer edges of the silver strips 24 and 25, and when it is in the position shown by solid lines in Fig. 5, it serves to elongate the image of a star, the sun, or other object on which observations are taken. Such an image is elongated in a direction at right angles to the axis of the cylindrical surface of the lens, as shown in Figs. 7ⁱ, 7ʲ, and 7ˡ. When the cylindrical lens is thrown out of the path of the rays from the lens 1, it occupies the position shown by the dotted lines in Fig. 5. This lens 34 is secured in a frame 35 which is secured to a shaft 36, shown in Figs. 1 and 2. This shaft projects thru the case of the instrument and is rotatable thru 90° by means of a lever 37, so that the lens 34 may be thrown to either of the two positions described. Suitable spring detents are provided whereby the lens will be held in either position as desired.

Having fully explained the optical parts reference is now made to Figs. 1, 2 and 3. All of the optical parts of the instrument except prism 7 are mounted in a case 38 which is provided with a removable cover plate 39. Secured to this case is a handle 40 by means of which the observer may conveniently hold the instrument in his right hand. A rubber eye-buffer 41 is secured to an extension 42 of the case, and a rotatable knurled ring 43 is provided by means of which the lens 3 may be moved in or out in order to focus the instrument.

The prism 7 is mounted in a frame 44 which is secured to a shaft 45. This shaft is rotatable about the axis 8 in two bearings on opposite sides of the prism 7, one bearing being in the case 38 and the other in an arm 46 which is secured to the case 38. An arm 47 is an extension of one side of the prism frame 44, and is secured to the lower end of this arm by means of screws 48 to an index plate 49. There is a rectangular hole cut in this plate and on this plate near the edge of this hole is engraved an index line 50. The holes in arm 47 for screws 488 are elongated, and if these screws are loosened, the position of the index line 50, with respect to arm 47, and therefore with respect to prism 7, may be adjusted by means of the opposed screws 51.

An arm 52 and arc 53 are cast integral with the case 38. On the periphery of this arc 53 are machined worm wheel teeth, the center of this sector of worm wheel being the axis 8. Plate 49 is bent around the arc 53, without touching it, as shown in Fig. 3. To this plate is secured the micrometer frame 54. A shaft 55 is rotatably supported in bearings in a frame 54. To one end of this shaft is keyed a conical worm 56, and to the other a micrometer drum 57. The worm 56 meshes with the teeth cut on the arc 53, and therefore arm 47 and prism 7 may be rotated about the axis 8 by rotation of a knob 58 which is pinned to the shaft 55. An index line 59 is engraved on an arm 60 which forms a part of the frame 54.

This frame 54 is rotatable with respect to plate 49 thru a small angle on pivots 61 and this rotation is accomplished by means of an eccentric collar secured to the shaft to which lever 62 is secured. This shaft is secured rotatably in the plate 49 and the eccentric collar fits in an elongated hole in the frame 54. The arrangement of these parts is such that when a lever 62 is pushed downwardly worm 56 is disengaged from the teeth on the arc 53 and therefore arm 47 can be swung rapidly to any desired position. When the lever 62 is pushed upwardly, the worm 55 engages with the teeth on this arc 53, and a very precise adjustment of the prism 7 may be effected by rotation of the knob 58.

On the arc 53, or on a plate secured thereto, is engraved a scale 63, in degrees, the center of this scale being at axis 8. Since rotation of the prism 7 thru a given angle changes the direction of the rays of light reflected in this prism by an angle twice as large, the space between two successive degree marks on this scale 63 subtends an angle of only one-half degree at axis 8. Another scale 64 is engraved on the periphery of the drum 57, and if the teeth on the arc 53 are one-half degree apart, and if the scale 64 is divided into sixty divisions, each division will represent a shift of one minute of arc in the direction of the rays of light reflected by the prism 7.

The spirit level 10 is mounted in a frame 65 secured to the case 38. To this frame 65 is secured a mirror 67 rotatable on pin 66 for the purpose of providing illumination for the spirit level when the instrument is used in daylight. A screw 68 is provided, the tip of which projects into the interior of the spirit level thru a metal bushing cemented into one end of the level. Thus by turning this screw in or out, the pressure inside the level may be increased or decreased, thus changing the length of the bubble as desired. On the upper surface of the bubble are engraved a scale and reference line, the images of which are represented in the rectangular areas in Fig. 7ª, so that the length of the bubble may be measured and adjusted to the desired dimension, or the correction read from the scale directly in case it is not desired to alter the size of the bubble.

A lamp 68ª is mounted in a suitable holder which is rotatably secured to the frame 54 and serves to illuminate either scale 63 or 64 as desired. Another lamp 69 in a holder is rotatably secured to the case 38 and serves to illuminate the spirit level when artificial illumination is desired. These lamps are energized by means of a dry-cell 70 which, for convenience, is contained in the handle 40. Lamp 68ª is turned on or off by a switch 71, and lamp 69 by a switch 72.

If the instrument as a whole be tilted about an axis parallel to the axis 8, it is obvious that the image of an object viewed thru the instrument will appear to move in the field of view parallel to the longer dimension of the silver strips 24 and 25. The relation of the focal lengths of lenses 15 and 16, and of the curvature of the spirit level 10, to the focal length of lens 1, is such, and the positions of the lenses 15 and 16 with respect to the level and the focal plane is so chosen, that, when the instrument is tilted about an axis parallel to the axis 8, the images of the bubble move the same distance in the focal plane as the image of the object viewed by means of the lens 1 in that part of the field of view outside the rectangular areas. Also the arrangement of the reflecting elements in the optical system is such that, when the instrument is tilted as described, the images of the bubble move in the same direction as the image of the object viewed. Furthermore, the focal length of lens 33 is equal to that of lens 1, so that, when prism 17 is in the position shown by dotted lines in Fig. 4 and the instrument is tilted about an axis parallel to the axis 8, the image of the object viewed in the rectangular areas will move the same distance as the image of an object viewed in the remainder of the field. Also the arrangement of reflecting surfaces is such that these images will move in the same direction.

It will be seen that if the instrument be rotated about an axis parallel to the axis of lenses 2 and 3, the images of the bubble will appear to move from side to side in the rectangular apertures in the field of view in which these images are seen. The prism systems 12 and 13 are so positioned and adjusted that when the axis 8 is horizontal, each image of the bubble appears to lie midway between the two longer sides of the rectangular area in which said image is seen.

Four plates of colored glass 73 are mounted in separate frames, each of which is rotatably secured to a pin 74 attached to the case 38, so that any one or all of these plates may be swung into or clear of the path of the rays from the prism 7 to the prism 6.

The method of operation of the embodiment of the invention herein described will readily be understood from the following description and by reference to Figs. 7ª to 7¹, inclusive.

Let it be assumed that the observer using the instrument desires to measure the angle of elevation of the sun, a star, or other heavenly body above the horizontal plane thru the instrument. The instrument is held with the eye-piece axis approximately horizontal, is directed to the proper azimuth, and prism 7 is turned on axis 8 until, on looking into the eyepiece, the image of the heavenly body observed is seen to be on a line connecting the tops of the two images of the bubble. When this has been done, the view as seen by the observer looking into the eyepiece is represented by Figs. 7ᵉ and 7ᶠ. This setting having been made, the angle of elevation of the heavenly body observed above the horizontal can be determined by reading scales 63 and 64 provided the instrument has been properly adjusted, as described hereinafter. According to the construction described, the scale 63 would indicate the number of degrees, and the scale 64 the number of minutes, of this angle of elevation.

Figs. 7$^e$ and 7$^f$ represent the field of view with lens 34 in the position shown by dotted lines in Fig. 5. If now the observer desires to draw the image out into a line, in order to make a more accurate setting, this can be done by turning lever 37 so that lens 34 occupies the position shown by solid lines in Fig. 5. This having been done, the field of view would have the appearance represented by Figs. 7$^i$ and 7$^j$.

If the observer desires to measure the angle of elevation of a heavenly body above the horizon, prism 17 is raised by means of a milled head 31 to the position shown by dotted lines in Fig. 4. He would then proceed as described in the preceding paragraph except that prism 7 would be rotated on the axis 8 until the image of the heavenly body, with the lens 34 in the position shown by dotted lines in Fig. 5, lies on, is tangent to, or bisected by, the line determined by the two images of the horizon seen in the two rectangular areas in the field of view. This having been done, the appearance of the field of view would be as represented in Fig. 7$^g$. In this case, also lens 34 could be swung to the position indicated by solid lines in Fig. 5, whereupon the filed of view would take on the appearance represented by Fig. 7$^l$.

The instrument described may also be used to measure the angle of depression of the actual horizon below the true horizontal plane passing thru the instrument. To do this, prism 17 is lowered to the position shown by solid lines in Fig. 4, the instrument is held with the eyepiece axis approximately horizontal, and prism 7 is turned on axis 8 until the images of the bubble appear to be tangent to a line determined by the image of the horizon. The field of view would then have the appearance represented by Fig. 7$^d$, and the angle of depression of the horizon, known as the "dip of the horizon", would be indicated by scales 63 and 64.

There are various methods by which the observer using the instrument may adjust it so he may assure himself that the readings are correct. First, let it be assumed that the observer can see an object which is known to lie in the same horizontal plane as the instrument, or so nearly in said plane that the angle of depression or elevation of said object below or above said plane is negligible.

The prism 7 is then rotated on the axis 8 until the images of the bubble appear to be tangent to the line determined by the image of the object sighted. With the instrument set in this manner, the scales 63 and 64 will read zero if the instrument is in adjustment.

If said scales do not read zero, they are set to zero and prism 7 is rotated about axis 8 by means of the adjustment screws 51 until the images apear to lie in the relative positions described. It is obvious that, if the object used for adjustment does not lie in the horizontal plane passing thru the instrument, but at a known angle above or below said plane, the same method of adjustment may be used, except that scales 63 and 64, instead of being set at zero, are set at the known angle of elevation or depression of the object used, and prism 7 is rotated by means of screws 51, as described. This method of adjustment is illustrated by Fig. 7$^d$, where adjustment has been made by sighting on the horizon. In this case, scales 63 and 64 would be set to the known dip of the horizon corresponding to the height of the instrument above sea level and adjustment made by means of screws 51 as already described.

It has been pointed out hereinbefore that prism 17 may be lowered to the position shown by full lines in Fig. 4 and in this case an image of the bubble can be seen in each of the rectangular areas in the field of view, and also that, if said prism is raised to the position shown by dotted lines in Fig. 4, there is seen in said rectangular areas an image of the horizon or other object external to the instrument, such image being formed by the lens 33. It is also possible to move the prism 17 to a position intermediate between the two positions described. whereupon there will be seen in each of said rectangular areas an image of the bubble and superimposed thereon an image of an object external to the instrument, as represented in Fig. 7$^c$. If the external object observed lies in the horizontal plane passing thru the instrument, and if each image of the bubble apears tangent to the image of said object when the scales 63 and 64 are set to zero, it is known that the spirit level and the parts concerned in the formation of said images are in proper adjustment.

Another method of adjustment is as follows:—Prism 17 is raised to the position shown by dotted lines in Fig. 4, the scales 63 and 64 are set to zero, and the instrument directed so that the observer sees in the field of view images of any suitable object. Then, if the instrument is in proper adjustment, the image of said object as seen in the rectangular areas in the field of view would appear to be continuous with the image of said object seen in the remainder of the field, as in Fig. 7$^h$, illustrating adjustment on the horizon. If this condition does not obtain, adjustment is effected by means of screws 51 until said images do appear continuous. Furthermore, if the angle subtended at the instrument by two suitable objects is known, scales 63 and 64 may be set to read said angle and the instrument so directed that the image on one of said objects is visible in one or both of the rectangular areas in the field of view and the image of the other of said objects is visible in the remainder of the field of view. Then, if the instrument is in proper adjustment, all of said images would appear to lie in the same line in the field of view. If these images do not appear to lie in line, as described, adjustment may be made by means of screws 51, as already described.

In the foregoing description of the use and adjustment of the instrument, it has been assumed that the top of the images of the bubble is used for alignment. It is obvious that the center, the bottom, or any other portion of said images may be used as well. It is also obvious, however, that if any portion other than the center of the images of the bubble is used for alignment, errors would be introduced by changes occurring in the length of the bubble, due to changes in temperature or other causes. In order to correct for these errors, there is engraved on the upper surface of the glass tube of the spirit level 10 a series of transverse marks, suitably spaced, as already described. By means of these marks and suitable numerals engraved adjacent thereto, the length of the bubble may be measured. If the length of the bubble is greater or less than that for which the instrument is adjusted, the length of said bubble may be adjusted as desired by means of screw 68, as already described. Instead of changing the length of the bubble, the difference between its actual length and the length for which the instrument was adjusted may be determined by means of the numerals described, and a correction applied to the reading of scales 63 and 64, the magnitude and algebraic sign of said correction being dependent on the said difference between the actual length of bubble and the length for which the instrument was adjusted.

It has been pointed out hereinbefore that the construction is such that, if prism 17 is in the position shown by solid lines in Fig. 4 and if the instrument be rotated about an axis parallel to axis 8, the images of the bubble seen in the rectangular areas in the field of view, and the image of external objects seen in the remainder of the field of view, move in the same direction and at the same rate. It has also been pointed out that, with prism 17 in the position shown by dotted lines in Fig. 4, rotation of the instrument about an axis parallel to axis 8 will cause the image seen in the rectangular areas to move in the same direction, and at the same rate, as the image seen in the remainder of the field. Hence, in using or adjusting the instrument as described above, except in the case of determination of the length of the bubble, the desired alignment of the various images involved in said adjustment or use may be effected either at the top, bottom, or any other part of the rectangular areas, without impairing the accuracy or efficiency of such adjustment or use.

It should be noted that, if the angle of elevation or depression of some object above or below the horizon, or the horizontal plane passing thru the instrument, is to be measured, such measurement will not be accurate unless the instrument is so held that axis 8 is approximately horizontal. It has already been pointed out that when the instrument is so held, the image of the bubble in each of the rectangular areas in the field of view appears to lie central laterally in such area. Obviously then, if axis 8 is not horizontal, the bubble will move laterally in the spirit level 10 and the image of said bubble will appear to move laterally in the rectangular area in which it is seen, as represented in Fig. 7$^k$. Thus the observer is enabled to determine whether or not the instrument is in such position that axis 8 is horizontal.

A further indication as to whether the instrument is so held that axis 8 is horizontal is obtained by noting whether or not the image of the horizon, or of any other object known to be horizontal, appears perpendicular to the longer edges of the areas in the field of view.

It should be noted that, in the application of this invention, the spirit level might be replaced by a pendulum, gyroscope or other device which maintains a fixed relation to the vertical. In case a pendulum or gyroscope were used, an image, or images, of a mark thereon would be projected into the field of view, in lieu of an image, or images, of the bubble. Furthermore, in the application of this invention, a cylindrical lens might also be introduced in the path of the rays focusing the image or one or all of the several images of said bubble or mark, thus elongating said image or images. Also, the construction might be modified so as to project into the field of view two or more images of the sun, star or other celestial or terrestial object observed. Again, by slight changes in the construction, only one image of the bubble; or of the mark on the gyroscope or pendulum might be projected into the field of view, or only one portion of an image of an external object as formed by lens 33, or a lens corresponding thereto. Likewise three or more images of the bubble or of said mark or three or more portions of the image of said external object, could, by slight changes in the construction, be projected into the field of view. Hence, since these and many other changes could be made in the structure without departing from the scope of the invention, it is intended that all matter herein illustrated and described is to be construed as illustrative, and not in a limiting sense.

Without further analysis, the foregoing will so fully reveal the gist of this invention that others can by applying current knowledge readily adapt for various applications, the features that, from the standpoint of the prior art, constitute the essential characteristics of this invention, and therefore such adaptations should and are intended to be comprehended within the meaning and range of equivalency of the following claims.

We claim:

1. In an apparatus for measuring the angle between two objects, in combination, means for producing in a common focal plane images of said objects, means in the vicinity of said focal plane for dividing the field of view into three or more portions, means for dulplicating the image of one of said objects in two of said portions, means for producing in one of the remainder of said portions an image of the other of said objects, means for limiting each of said images to a particular portion of said field of view, a rotatable reflector associated with the means for forming one of said images, and means for measuring the angle of rotation of said reflector.

2. In an apparatus for measuring the angle between two objects, in combination, means for producing, in a common focal plane, an image of one of said objects in a central portion of the field of view, an image of the other of said objects on either side of said central portion, means for producing sharply defined lines of demarcation between said images, a rotatable reflector associated with one of said image forming means, and means for measuring the angle of rotation of said reflector.

3. In an apparatus for measuring the angle of elevation or depression of an object above or below the horizontal plane passing through said apparatus, in combination, means for indicating said horizontal plane, means for projecting into the field of view a multiplicity of images of said indicating means, a rotatable reflector and means for measuring the angle of rotation of said reflector.

4. In an instrument for the measurement of angles the vertices of which are at said instrument, in combination, means for producing in a common field of view images of two objects, means for confining each of said images to a different portion of said field of view, and means for excluding from that portion of the field of view occupied by the image of either of said objects all light from the other of said objects.

5. In an apparatus for measuring the angle between two objects, in combination, means for forming an image of one of said objects in a band in the field of view of said apparatus, means for forming an image of the other of said objects on either side of said band, means for limiting the image of the first mentioned object to said band and for limiting the image of said other object to the area on either side of said band, means for deviating the light from one of said objects, and means for measuring the angle of said deviation.

6. In an apparatus for measuring the angle between two objects, in combination, means for forming an image of one of said objects in a particular portion of the field of view, means for sharply defining the limits of said portion of the field of view, means for forming an image of the other of said objects on either side of said portion, means for limiting the image of the first named object to the said portion of the field of view, means for limiting the image of said other object to the area on either side of said portion, means for deviating the light from either of said objects, and means for measuring the angle of said deviation.

7. In an apparatus for measuring angles the vertices of which are at said apparatus, in combination, means for dividing the field of view of said apparatus into a multiplicity of portions, means for producing sharply defined lines of demarcation between said portions, means for forming an image of an object in each of one or more of said portions, means for forming an image of a second object in each of one or more of the remainder of said portions, means for deviating the light from either of said objects, and means for measuring the angle of said deviation.

8. In an apparatus for measuring the angle between two objects, in combination, means for simultaneously viewing a plurality of images of each of said objects, means for deviating the light forming the image or images of one of said objects, and means for measuring the angle of said deviation.

9. In an apparatus for measuring the angle between two objects, in combination, means for producing an image of each of said objects, means for elongating one of said images, means for deviating the light forming one of said images, and means for measuring the angle of said deviation.

10. In an apparatus for measuring the angle between two objects, in combination, means for producing an image of each of said objects, means for elongating each of said images, means for diviating the light forming either of said images, and means for measuring the angle of said deviation.

11. In an apparatus for measuring the angle between two objects, in combination, means for producing an image of one of said objects, means for elongating said image, means for producing a plurality of images of the other of said objects, means for deviating the light forming the image or images of either of said objects, and means for measuring the angle of said deviation.

12. In an apparatus for measuring the angle between two objects, in combination, means for producing a plurality of images of each of said objects, means for elongating any one or more of said images, means for deviating the light from either of said objects, and means for measuring the angle of said deviation.

13. In an apparatus for measuring the angle of elevation or depression of an object with respect to the horizontal plane passing through said apparatus, in combination, means for indicating said plane, means for producing a plurality of images of said indicating means, means for producing an image of said object, means for deviating the light from said object, and means for measuring the angle of said deviation.

14. In an apparatus for measuring the angle of elevation or depression of an object with respect to the horizontal plane passing through said apparatus, in combination, means for forming an image of said object, means for elongating said image, means for indicating said horizontal plane, means for forming an image of said indicating means, means for deviating the light forming one of said images to cause relative motion thereof, and means for measuring the angle of said deviation.

15. In an apparatus for measuring the angle of elevation or depression of an object with respect to the horizontal plane passing through said apparatus, in combination, means for forming an image of said object, means for indicating said horizontal plane, means for forming an image of said indicating means, means for elongating said image of said indicating means, means for deviating the light forming one of said images to cause relative motion of said images, and means for measuring the angle of said deviation.

16. In an apparatus for measuring the angle of elevation or depression of an object with respect to the horizontal plane passing through said apparatus, in combination, means for forming an image of said object, means for indicating said horizontal plane, means for forming an image of said indicating means, means for elongating each of said images, means for deviating the light forming one of said images, and means for measuring the angle of said deviation.

17. In an apparatus for measuring the angle of elevation or depression of an object with respect to a horizontal plane passing through said apparatus, in combination, means for producing an image of said object, means for indicating said horizontal plane, means for producing a plurality of images of said indicating means, means for elongating each of said plurality of images, means for deviating the light from the aforesaid object, and means for measuring the angle of said deviation.

18. In an apparatus for measuring the angle of elevation or depression of an object with respect to the horizontal plane passing through said apparatus, in combination, means for indicating said horizontal plane, means for producing an image of said indicating means, means for producing a plurality of images of said object, means for elongating each of said plurality of images, means for deviating the light forming said image of said object, and means for measuring the angle of said deviation.

19. In an apparatus for measuring the angle of elevation or depression of an object with respect to the horizontal plane passing through said apparatus, in combination, means for indicating said horizontal plane, means for producing images of said object and said indicating means, means for elongating either of said images, means for deviating the light forming either of said images, and means for measuring the angle of said deviation.

20. In an apparatus for measuring the angle of elevation or depresison of an object, in combination, means for dividing the field of view of said apparatus into a plurality of areas, means for producing an image of said object in one of said areas, means for producing an image of the horizon in another of said areas, means for indicating the horizontal plane passing through said apparatus, means for forming an image of said indicating means in one of said areas other than that in which the said image of said object is produced, and means for intercepting from that area of the field of view in which the aforesaid image of the object is produced all light from the horizon and from the said indicating means.

21. In an apparatus for measuring the angle of elevation or depression of an object, in combination, means for indicating the horizontal plane through said apparatus, means for producing in the field of view of said apparatus images of said object, of said indicating means and of the horizon, means for intercepting from that portion of said field of view in which the image of said object is produced all light from the horizon and from said indicating means, means for deviating the light from said object and means for measuring the angle of said deviation.

22. In an apparatus for measuring the angle of elevation or depression of an object, in combination, means for deviating the light from said object, means for measuring the angle of said deviation, means for indicating whether the plane of said deviation is vertical, means for producing in the field of view of said apparatus an image of said indicating means, means for producing in said field of view a plurality of lines, and means whereby inclination of the plane of the aforesaid deviation causes the said image of the said indicating means to move with respect to the said lines.

23. In an apparatus for measuring the angle of elevation or depression of an object, in combination, means for indicating the horizontal plane through said apparatus, means for producing images of said indicating means and of the horizon in a particular portion of the field of view of said apparatus, means for producing an image of said object in another portion of said field of view, means for excluding from the last named portion of the field of view all light from the horizon and from said indicating means, means for deviating the light forming any of said images, and means for measuring the angle of said deviation.

Signed at Washington, D. C., this 31st day of January, 1927.

LAWRENCE RADFORD.
NOEL DAVIS.